May 20, 1958 A. N. WOOD ET AL 2,835,508
BICYCLE KICKSTAND SHOE
Filed Sept. 5, 1956

INVENTORS
ARTHUR N. WOOD
GERALD A. WOOD
BY
McMorrow, Berman & Davidson
ATTORNEYS

United States Patent Office 2,835,508
Patented May 20, 1958

2,835,508

BICYCLE KICKSTAND SHOE

Arthur N. Wood and Gerald A. Wood, Flippin, Ark.

Application September 5, 1956, Serial No. 608,057

1 Claim. (Cl. 280—301)

This invention relates generally to support structures and is more particularly concerned with a novel bicycle kickstand type support facilitating the parking of a bicycle on different support surfaces in a substantially vertical and readily accessible position for subsequent use.

Messenger boys, newspaper boys and the like are often required to make numerous stops when riding their bicycles, and it is highly desirable to have a support which may be readily disposed for the purpose of supporting the bicycle at a substantially vertical position for subsequent use, said support being adaptable to various angular deviations in a support surface upon which the bicycle is to be supported and including means for providing a suitable support on varying textures encountered in different support surfaces.

A primary object of invention in conformance with that set forth is to provide a bicycle kickstand support incorporating a rod member pivotal at one end about a horizontal pivot axis in laterally extending relationship from a bicycle frame, the other end of said support member incorporating shoe means providing an increased area of support for the rod member and including means adapting the same to varying angular deviations of a support surface upon which the other end of the rod member is to be disposed, said rod member being pivotally supported in angularly and laterally extending relationship from the bicycle frame of the bicycle upon which the kickstand support is being used.

A further object of invention in conformance with that set forth is to provide in a bicycle kickstand support of the character involved a pivotal foot element or shoe which is accommodated on the lower end of the laterally extending rod member of the kickstand support which may be pivoted into longitudinal alignment with the rod member during storage or for the purpose of providing a relatively sharpened extension on the end of the rod member for penetrating a relatively soft support surface, for example.

A still further object of invention in conformance with that set forth is to provide a bicycle kickstand support which is readily and economically manufactured, easily used, and highly satisfactory, practical and acceptable for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1:
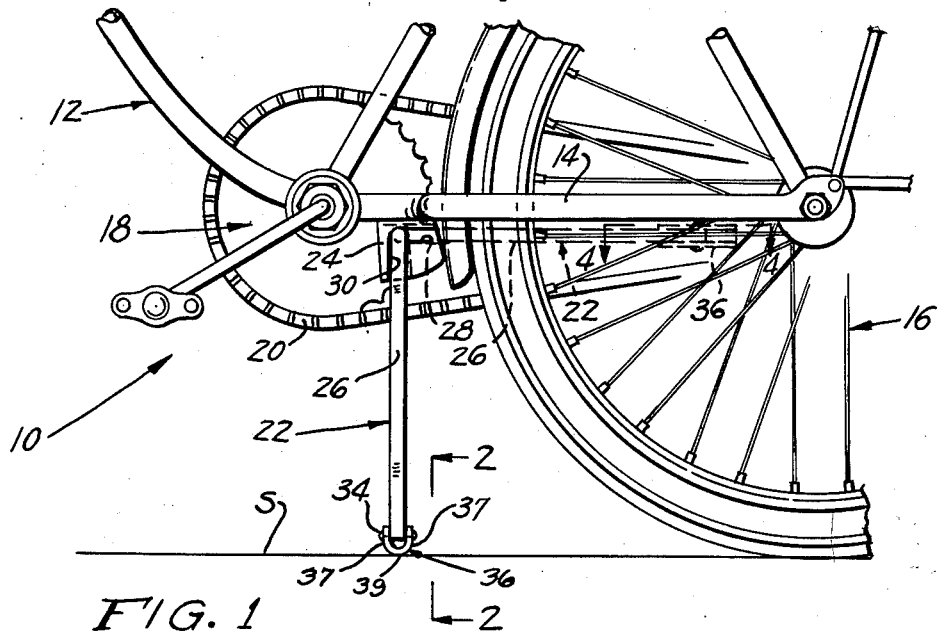
Figure 1 is a fragmentary side elevational view of a bicycle showing the kickstand support of the invention mounted on the rear fork portion thereof, showing in phantom lines an alternate position of the kickstand support when stored and not in use for supporting the bicycle.
Figure 2:
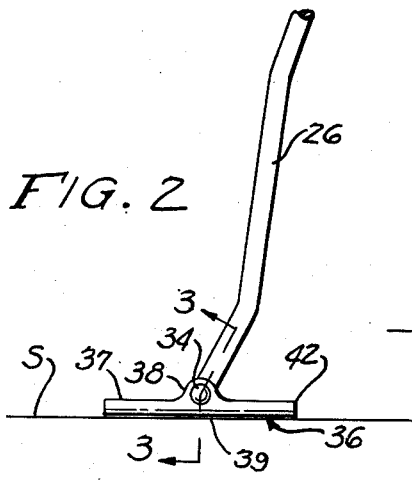
Figure 2 is an enlarged elevational view looking substantially from line 2—2 of Figure 1.
Figure 3:
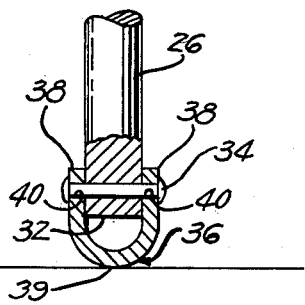
Figure 4:
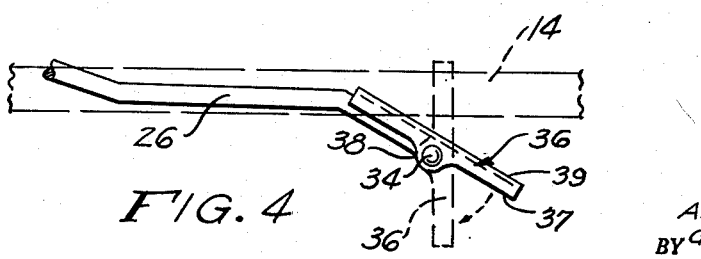

Figure 3 is a further enlarged fragmentary sectional view taken substantially on line 3—3 of Figure 2; and Figure 4 is an enlarged fragmentary plan view looking substantially from line 4—4 on Figure 1, showing by means of phantom lines the approximate position of one leg of the support fork of the bicycle frame, and showing by means of phantom lines the alternate position of the shoe member which may be displaced by a person's foot when utilized in the position shown in Figures 1 and 2.

Referring to the drawing in detail, the fragmentary portion of a bicycle as indicated generally at 10, said bicycle including a frame 12 including a rear wheel support fork 14 having journaled thereon a rear wheel assembly 16 driven in the usual manner by means of a sprocket assembly 18 through the medium of a drive chain 20. Indicated generally at 22 is the bicycle kickstand support which extends in longitudinally extending relationship relative to the longitudinal axis of the bicycle frame when in a stored position as indicated by phantom lines in Figure 1, and which is disposed in laterally and angularly extending relationship as shown by the solid lines in Figure 1.

Suitably secured in depending relationship from the bicycle frame fork 14 is a support plate 24 which is suitably apertured and which pivotally supports a rod member 26 of the support stand in either the phantom line position shown in Figure 1 or the solid line position also shown therein, these positions being equivalent to the "stored" and "support" positions of the kickstand support. The rod member 26 is conformed to extend angularly away from the fork of the bicycle frame being movable to the solid line position of Figure 1 in the conventional manner, i. e., depression by engagement with the heel of the user of the bicycle, for example, the support plate 24 incorporating angularly related detent portions or grooves 28 and 30 for retaining the rod member 26 in the previously mentioned locations.

A foot element embodying an elongated bar 36 having a convexly curved under face is positioned adjacent the other end of the rod member 26 so that the under face is remote from said other end and has the part above the under face connected to the other end of the rod member for movement about an axis transverse of the rod member or support shaft 34. Specifically, the elongated bar 36 has a pair of upstanding legs 37 and a convexly curved bight 39 connects the lower ends of the legs together. The mid-portions of the free ends of the legs 37 have upstanding ears 38, only one being shown, the ears having registering openings 40 which receive the support shaft 34. When the foot element 36 is pivoted to the position shown in solid lines in Figure 4, said foot element will be disposed in alignment with the longitudinal axis of the rod member 26 and accordingly may be stored in the position shown by the phantom lines in Figure 1. When disposed in the position shown in Figure 2, transversely of the longitudinal axis of the rod member 26 providing a substantially increased bearing area engageable with the support surface S, and by virtue of its pivotal relationship on the lower end of the rod member 26 will conform to angular deviations of the support surface relative to the bicycle. Thus the bicycle may be leaned in a substantially vertically disposed relationship when parked and will be readily available for subsequent use. When the foot element 36 is pivoted in a direction opposite from that indicated by the dotted arrow in Figure 4, the rod member 26 will be substantially extended, and the sharpened corner portions 42 of said foot element will be suitable for penetrating the support surface for the purpose of entering a relatively soft terrain upon which the bicycle is being parked. As seen in Figure 4, the foot element 36 will normally be disposed in the position shown by the solid lines when the kickstand is "stored," and the foot element 36 may be pivoted by means of one's toe, for example, to the phantom line position, that shown by means of solid lines in Figures 1 to 3, for the purpose of subsequent use.

The foot element may be constructed by means of folding, extrusion or the like, and will be readily and economically installed for accomplishing the advantages clearly set forth in the objects of the invention.

The foregoing is considered as illustrative only of the principles of the invention. Further, since numerous modifications and changes will readily occur to those skilled in the art, it is not intended to limit the invention to the exact construction and operation shown and described, and accordingly all suitable modifications and equivalents may be resorted to, falling within the scope of the appended claim.

What is claimed as new is as follows:

In a bicycle including a horizontally disposed rear wheel support fork, a vertically disposed support plate carried by said fork, and a kickstand rod member normally extending in horizontal spaced relation along said fork and having one end connected to said support plate for movement of said rod member from the horizontal position to a vertical position, the improvement consisting in a foot element embodying an elongated bar having a pair of upstanding legs and a convexly curved bight connecting the lower ends of the legs together positioned so that the bight is remote from the other end with the legs adjacent said other end and having the legs connected to the other end of said rod member for movement about an axis transverse of said rod member, the under face of the bight of said foot element when the rod member has been moved to the vertical position providing a bearing area engageable with a support surface upon which the bicycle is parked.

References Cited in the file of this patent

UNITED STATES PATENTS

| | | |
|---|---|---|
| 617,028 | Koehler | Jan. 3, 1899 |
| 670,125 | Williams | Mar. 19, 1901 |
| 1,113,446 | Kline et al. | Oct. 13, 1914 |
| 2,319,066 | Klatt et al. | May 11, 1943 |

FOREIGN PATENTS

| | | |
|---|---|---|
| 568,050 | France | Dec. 15, 1923 |
| 197,463 | Switzerland | July 16, 1938 |